(12) United States Patent
Urimoto et al.

(10) Patent No.: US 10,479,398 B2
(45) Date of Patent: Nov. 19, 2019

(54) INTEGRATED ELECTRIC POWER STEERING APPARATUS AND MANUFACTURING METHOD THEREFOR

(71) Applicant: Mitsubishi Electric Corporation, Tokyo (JP)

(72) Inventors: Kentaro Urimoto, Tokyo (JP); Yoshihito Asao, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/573,515

(22) PCT Filed: Oct. 20, 2015

(86) PCT No.: PCT/JP2015/079506
§ 371 (c)(1),
(2) Date: Nov. 13, 2017

(87) PCT Pub. No.: WO2017/068636
PCT Pub. Date: Apr. 27, 2017

(65) Prior Publication Data
US 2018/0093698 A1 Apr. 5, 2018

(51) Int. Cl.
*B62D 5/04* (2006.01)
*H02K 11/21* (2016.01)
(Continued)

(52) U.S. Cl.
CPC ............ *B62D 5/0406* (2013.01); *B23P 19/02* (2013.01); *B23P 19/10* (2013.01); *B62D 5/0481* (2013.01);
(Continued)

(58) Field of Classification Search
CPC ........ H02K 11/33; H02K 5/225; H02K 11/30; H02K 15/03; H02K 3/28; H02K 7/083; B62D 5/0406; B62D 5/046
See application file for complete search history.

(56) References Cited

U.S. PATENT DOCUMENTS

| | | | |
|---|---|---|---|
| 7,154,244 B2 * | 12/2006 | Asaumi | B62D 5/046 318/599 |
| 8,348,008 B2 * | 1/2013 | Yamaguchi | B62D 5/0406 180/444 |

(Continued)

FOREIGN PATENT DOCUMENTS

| | | |
|---|---|---|
| CN | 102362413 A | 2/2012 |
| CN | 104852528 A | 8/2015 |

(Continued)

OTHER PUBLICATIONS

International Search Report for PCT/JP2015/079506 dated Dec. 28, 2015 [PCT/ISA/210].

(Continued)

*Primary Examiner* — Thai T Dinh
(74) *Attorney, Agent, or Firm* — Sughrue Mion, PLLC; Richard C. Turner

(57) ABSTRACT

A control unit for controlling an electric motor has on a wiring board at least an inverter circuit including two or more switching devices for supplying an electric current to the electric motor and a CPU for outputting command signals to the inverter circuit; the control unit, as an inverter module in which the wiring board is mounted in a housing with which a connector is integrated, is integrally fixed to the motor.

10 Claims, 7 Drawing Sheets

(51) Int. Cl.
 *H02K 11/33*   (2016.01)
 *B23P 19/02*   (2006.01)
 *B23P 19/10*   (2006.01)
 *H02K 3/28*   (2006.01)
 *H02K 15/00*   (2006.01)
 *H02K 15/14*   (2006.01)
 *H02K 5/22*   (2006.01)

(52) U.S. Cl.
 CPC ............... *H02K 3/28* (2013.01); *H02K 5/225* (2013.01); *H02K 11/21* (2016.01); *H02K 11/33* (2016.01); *H02K 15/0062* (2013.01); *H02K 15/14* (2013.01)

(56) References Cited

U.S. PATENT DOCUMENTS

| | | | | |
|---|---|---|---|---|
| 8,981,607 | B2* | 3/2015 | Suga | H02K 3/50 |
| | | | | 310/71 |
| 2006/0152095 | A1* | 7/2006 | Kikuchi | H02K 11/048 |
| | | | | 310/68 R |
| 2006/0158049 | A1* | 7/2006 | Suzuki | H02K 11/33 |
| | | | | 310/52 |
| 2007/0119649 | A1 | 5/2007 | Manken et al. | |
| 2010/0288577 | A1* | 11/2010 | Sonoda | B62D 5/0406 |
| | | | | 180/446 |
| 2011/0254387 | A1* | 10/2011 | Matsuda | B62D 5/0406 |
| | | | | 310/43 |
| 2012/0091839 | A1 | 4/2012 | Hein et al. | |
| 2012/0229005 | A1* | 9/2012 | Tominaga | B62D 5/0406 |
| | | | | 310/68 B |
| 2013/0202464 | A1* | 8/2013 | Miyaki | F01C 21/10 |
| | | | | 417/410.4 |
| 2014/0021833 | A1* | 1/2014 | Nakai | H02K 5/225 |
| | | | | 310/68 D |
| 2014/0054991 | A1* | 2/2014 | Hyodo | F04C 2/18 |
| | | | | 310/71 |
| 2015/0189794 | A1* | 7/2015 | Tashima | B62D 5/0406 |
| | | | | 180/446 |
| 2015/0236570 | A1 | 8/2015 | Hayashi | |
| 2015/0333600 | A1 | 11/2015 | Nakano et al. | |
| 2016/0105992 | A1* | 4/2016 | Krivonak | H05K 7/209 |
| | | | | 361/707 |
| 2016/0347354 | A1* | 12/2016 | Asao | B62D 5/0406 |
| 2017/0349206 | A1 | 12/2017 | Asao et al. | |
| 2018/0198351 | A1 | 7/2018 | Akutsu et al. | |
| 2018/0233992 | A1* | 8/2018 | Takeuchi | B62D 5/0406 |

FOREIGN PATENT DOCUMENTS

| | | |
|---|---|---|
| EP | 3260352 A1 | 12/2017 |
| EP | 3334015 A1 | 6/2018 |
| JP | 2009248864 A | 10/2009 |
| JP | 5316469 B2 | 10/2013 |
| JP | 2015-123846 A | 7/2015 |
| JP | 2015-180157 A | 10/2015 |
| WO | 2014/054098 A1 | 4/2014 |
| WO | 2015/145630 A1 | 10/2015 |

OTHER PUBLICATIONS

Communication dated Oct. 16, 2018, from Japanese Patent Office in counterpart application No. 2017-546302 Machine Translation.
Communication dated May 17, 2019, from the European Patent Office in application No. 15906643.0.
Chinese Office Action dated Sep. 27, 2019, in Patent Application No. 201580083487.7.

* cited by examiner

_US 10,479,398 B2_

INTEGRATED ELECTRIC POWER STEERING APPARATUS AND MANUFACTURING METHOD THEREFOR

CROSS REFERENCE TO RELATED APPLICATIONS

This application is a National Stage of International Application No. PCT/JP2015/079506 filed Oct. 20, 2015, the contents of all of which are incorporated herein by reference in their entirety.

TECHNICAL FIELD

The present invention relates to a vehicle electric power steering apparatus, particularly to an integrated electric power steering apparatus in which an electric motor and a control unit are integrated, and to the manufacturing method therefor.

BACKGROUND ART

As disclosed in Patent Documents 1 and 2, a conventional integrated electric power steering apparatus in which an electric motor and a control unit are integrated is provided with two or more connectors to be connected with a great number of sensors and a power source; in particular, in the control unit, there are provided a great number of circuits, components, and the like such as an inverter circuit for supplying electric power to the electric motor, a control circuit mainly including a CPU (Central Processing Unit), and electric wires for connecting these circuits. Accordingly, it is required that in an integrated electric power steering apparatus having a structure in which an electric motor and a control unit are integrated, the control unit is further downsized, lightened, and cost-saved; from these points of view, there has been a room for further improvement thereof.

PRIOR ART REFERENCE

Patent Document

[Patent Document 1] international Publication No. WO2014/05409810

[Patent Document 2] Japanese Patent Publication. No. 5316469

DISCLOSURE OF THE INVENTION

Problems to be Solved by the Invention

In each of the conventional integrated electric power steering apparatuses disclosed in Patent Documents 1 and 2, a control unit is mounted at the anti-output side of the output shaft of a motor. Connectors are arranged on the external wall surface of the control unit; in the control unit, a control board, a power module having switching devices included in an inverter circuit, a heat sink for cooling the power module, a rotation sensor for detecting the rotation position of the rotor in the motor, and the like have been arranged in such a way as to be stacked on one another in the axle direction. Moreover, in the control unit, a molding resin in which the connectors are mounted, the control board, a great number of members for electrically or mechanically connecting the respective portions thereof, and the like have been also arranged.

Accordingly, there have been problems that the conventional electric power steering apparatus is large-size and heavy and that it requires a great number of processes for electrically or mechanically connecting the respective portions of the members incorporated in the control unit.

The present invention has been implemented in order to solve the foregoing problems in a conventional electric power steering apparatus; the objective thereof is to provide an integrated electric power steering apparatus that is small-size and light and that can raise even the working efficiency of the mounting.

Means for Solving the Problems

An integrated electric power steering apparatus according to the present invention has an electric motor that generates assist torque corresponding to steering torque produced by a vehicle driver and a control unit that controls the electric motor; the electric motor and the control unit are integrally fixed to each other. The integrated electric power steering apparatus is characterized
in that the control unit is configured as a module comprising:
an inverter circuit including two or more switching devices that each supply an electric current to the electric motor;
a CPU that outputs command signals to the inverter circuit;
a wiring board on which at least the inverter circuit and the CPU are mounted;
a housing that contains the wiring board; and
respective connectors that are provided on the housing and connect a power source apparatus arid a sensor for detecting the operation state of the vehicle, which are provided outside the control unit, with the control unit, and
in that the control unit configured as the module is integrally fixed to the electric motor in the axel direction of the electric motor.

A manufacturing method for an integrated electric power steering apparatus, according to the present invention, is the one for an integrated electric power steering apparatus having an electric motor that generates assist torque corresponding to steering torque produced by a vehicle driver and a control unit that controls the electric motor and being formed
in such a way that the control unit is configured as a module comprising:
an inverter circuit including two or more switching devices that each supply an electric current to the electric motor;
a CPU that outputs command signals to the inverter circuit;
a wiring board on which at least the inverter circuit and the CPU are mounted;
a housing that contains the wiring board; and
respective connectors that are provided on the housing and connect a power source apparatus and a sensor for detecting the operation state of the vehicle, which are provided outside the control unit, with the control unit,
in such a way that the wiring board is contained in the housing in such a way that the surface thereof is perpendicular to the axel direction,
in such a way that the housing has wiring members to he connected with respective winding terminals of the electric motor, in such a way that each of the wiring members is disposed inside the housing in such a way as to extend in the axel direction, and in such a way that the control unit configured as the module is integrally fixed to the electric motor in the axel direction of the electric motor. The manufacturing method for an integrated electric power steering apparatus is characterized in that the control unit and the electric motor are assembled separately from each other and in that the control unit and the electric motor that are assembled separately from each other are integrally fixed to each other in the axel direction.

Advantage of the Invention

An integrated electric power steering apparatus according to the present invention makes it possible to obtain an integrated electric power steering apparatus that is small-size and light and that can raise even the working efficiency of the mounting.

Moreover, a manufacturing method for an integrated electric power steering apparatus according to the present invention makes it possible to readily produce an integrated electric power steering apparatus that is small-size and light and that can raise even the working efficiency of the mounting.

BEST MODE FOR CARRYING OUT THE INVENTION

Embodiment 1

Figure 1:
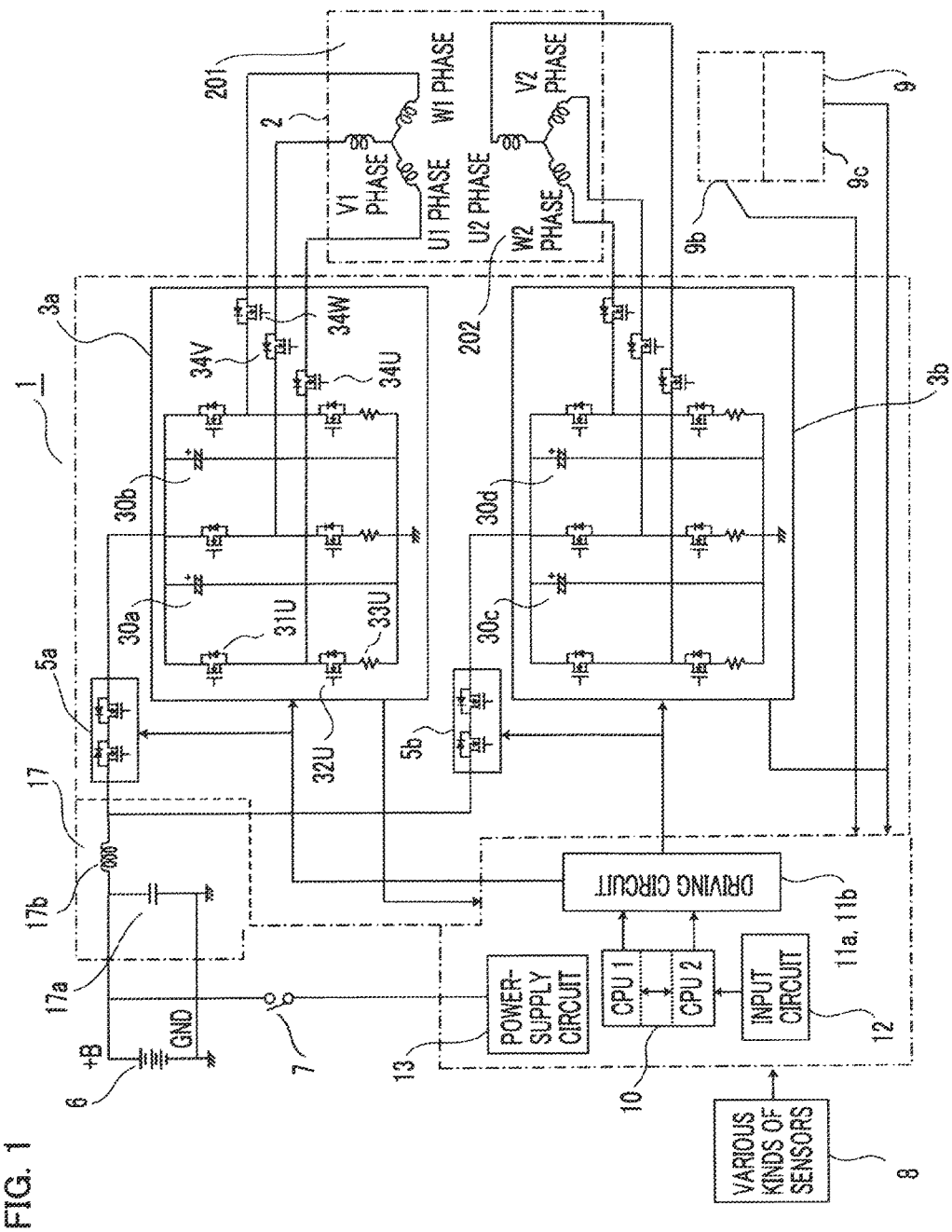
FIG. 1 is a circuit configuration diagram of an integrated electric power steering apparatus according to Embodiment 1 of the present invention.

Hereinafter, Embodiment 1 of the present invention will be explained with reference to the drawings. FIG. 1 is a circuit configuration diagram of an integrated electric power steering apparatus according to Embodiment 1 of the present invention; FIG. 1 represents a circuit configuration mainly including an electric motor 2 and a control unit 1. In Embodiment 1, the electric motor 2 is formed of a brushless electric motor provided with a stator having a first armature winding 201 and a second armature winding 202, which are independent from each other, and a rotor having magnetic-field poles formed of permanent magnets. The first armature winding 201 is formed of a three-phase winding in which a first U-phase winding U1, a first V-phase winding V1, and a first W-phase winding W1 are Y-connected. The second armature winding 202 is formed of a three-phase winding in which a second U-phase winding U2, a second V-phase winding V2, and a second W-phase winding W2 are Y-connected.

The electric motor 2 may be an electric motor with a brush; moreover, each of the first armature winding 201 and the second armature winding 202 may be a multiphase winding of three phases or more.

A rotation sensor unit 9 for detecting the rotation position of the rotor in the electric motor 2 is formed as a dual system and is provided with a first rotation sensor 9b, a second rotation sensor 9c, and a rotation sensor rotor 9a (refer to FIG. 2) that is shared by the first rotation sensor 9b and the second rotation sensor 9c. As described later, the rotation sensor rotor 9a is fixed at the anti-output side of the output shaft of the electric motor 2. The first rotation sensor 9b and the second rotation sensor 9c are arranged in such a way as to face the rotation sensor rotor 9a and to be spaced a predetermined gap apart from the rotation sensor rotor 9a in the axel direction. A battery 6 mounted in a vehicle, an ignition switch 7, and various kinds of sensors 8 such as a vehicle speed sensor and a torque sensor that detects steering torque on a handwheel are provided outside the control unit 1.

The control unit 1 has a first inverter circuit 3a that supplies electric power to the first armature winding 201 of the electric motor 2, a second inverter circuit 3b that supplies electric power to the second armature winding 202 of the electric motor 2, CPU10, a driving circuit 11, an input circuit 12, and a power-supply circuit 13.

The first inverter circuit 3a is formed of a three-phase bridge circuit having a U-phase arm including a U-phase upper arm and a U-phase lower arm, a V-phase arm including a V-phase upper arm and a V-phase lower arm, and a W-phase arm including a W-phase upper arm and a W-phase lower arm. The U-phase upper arm has a U-phase upper arm switching device 31U, and the U-phase lower arm has a U-phase lower arm switching device 32U.

Similarly, the V-phase upper arm has a V-phase upper arm switching device; the V-phase lower aim has a V-phase lower arm switching device; the W-phase upper arm has a W-phase upper arm switching device; the W-phase lower arm has a W-phase lower arm switching device. For the sake of avoiding the complexity of the drawings, the reference characters of the switching devices other than the U-phase arm switching devices are omitted; however, in the following explanations, these six switching devices may be referred to as switching devices 300 in a collective manner. Each of these switching devices 300 is formed of, example, a MOSFET having a parasitic diode.

The first inverter circuit 3a further has noise-suppression first and second capacitors 30a and 30b that are connected in parallel between the U-phase arm and the V-phase arm and between the V-phase arm and the W-phase arm, respectively. A first U-phase shunt resistor 33U, a first V-phase shunt resistor, and a first W-phase shunt resistor for detecting respective currents flowing in the first windings U1, V1, and W1 of the respective phases are connected with the U-phase lower arm switching device 32U, the V-phase lower arm switching device, and the W-phase lower arm switching device, respectively. For the sake of avoiding the complexity of the drawings, the reference characters of the shunt resistors other than the U-phase arm shunt resistor are omitted; however, these shunt resistors may be designated by Reference Numeral 33 in a collective manner.

A U-phase output terminal pulled out from the connection point between the U-phase upper arm and the U-phase lower arm of the first inverter circuit 3a is connected with the winding terminal of the first U-phase winding U1 by way of a U-phase first electric-motor switching device 34U. Similarly, a V-phase output terminal pulled out from the connection point between the V-phase upper arm and the V-phase lower arm is connected with the winding terminal of the first V-phase winding V1 by way of a V-phase first electric-motor switching device 34V. Moreover, a W-phase output terminal pulled out from the connection point between the W-phase upper arm and the W-phase lower arm is connected with the winding terminal of the first W-phase winding W1 by way of a W-phase first electric-motor switching device 34W. Each of the first electric-motor switching devices 34U, 34V, and 34W of the respective phases is formed of, for example, a FET having a parasitic diode and has a function as an electric-motor relay that opens or closes the path between the first armature winding 201 and the first inverter circuit 3a. In the following explanations, these electric-motor switching devices may be designated by Reference Numeral 34.

The second inverter circuit 3b is formed of a three-phase bridge circuit having a U-phase arm including a U-phase upper arm and a U-phase lower arm, a V-phase arm including a V-phase upper arm and a V-phase lower arm, and a W-phase arm including a W-phase upper arm and a W-phase lower arm. The U-phase upper arm has a U-phase upper arm switching device, and the U-phase lower arm has a U-phase lower arm switching device. Similarly, the V-phase upper arm has a V-phase upper arm switching device; the V-phase lower arm has a V-phase lower arm switching device; the W-phase upper arm has a W-phase upper arm switching device; the W-phase lower arm has a W-phase lower arm switching device. Each of these switching devices is formed of, for example, a MOSFET having a parasitic diode. For the sake of avoiding the complexity of the drawings, the reference characters of the arm switching devices of the respective phases are omitted; however, in the following explanations, these six switching devices may be referred to as switching devices 300 in a collective manner.

The second inverter circuit 3b further has noise-suppression third and fourth capacitors 30c and 30d that are connected in parallel between the U-phase arm and the V-phase arm and between the V-phase arm and the W-phase arm, respectively; as is the case with the foregoing first inverter circuit 3a, a second U-phase shunt resistor, a second V-phase shunt resistor, and a second W-phase shunt resistor for detecting respective currents flowing in the second windings U2, V2, and W2 of the respective phases are connected with the U-phase lower arm switching device, the V-phase lower arm switching device, and the W-phase lower arm switching device, respectively. For the sake of avoiding the complexity of the drawings, the reference characters of the shunt resistors of the respective phases are omitted; however, these shunt resistors may be designated by Reference Numeral 33 in a collective manner.

A U-phase output terminal pulled out from the connection point between the U-phase upper arm and the U-phase lower arm of the second inverter circuit 3b is connected with the winding terminal of the second U-phase winding U2 by way of a U-phase second electric-motor switching device. Similarly, a V-phase output terminal pulled out from the connection point between the V-phase upper arm and the V-phase lower arm is connected with the winding terminal of the second V-phase winding V2 by way of a V-phase second electric-motor switching device. Moreover, a W-phase output terminal pulled out from the connection point between the W-phase upper arm and the W-phase lower arm is connected with the winding terminal of the second W-phase winding W2 by way of a W-phase second electric-motor switching device. Each of the second electric-motor switching devices of the respective phases is formed of, for example, a FET having a parasitic diode and has a function as an electric-motor relay that opens or closes the path between the second armature winding 202 and the second inverter circuit 3b. For the sake of avoiding the complexity of the drawings, the reference characters of the second electric-motor switching devices of the respective phases are omitted; however, in the following explanations, these electric-motor switching devices may be designated by Reference Numeral 34 in a collective manner.

The positive-polarity input terminal of the first inverter circuit 3a is connected with a positive-polarity terminal +B of the battery 6, by way of a filter circuit 17 including a filter capacitor 17a and a filter coil 17b and a first power-source switching device 5a having a function as a power supply relay. Similarly, the positive-polarity input terminal of the second inverter circuit 3b is connected with the positive-polarity terminal +B of the battery 6, by way of the foregoing filter circuit 17 and a second power-source switching device 5b having a function as a power supply relay. Each of the first power-source switching device 5a and the second power-source switching device 5b is formed of two FETs that each have a parasitic diode and are connected in series with each other; the parasitic diode in one of the FETs is connected forward in the direction of current supply, and the parasitic diode in the other one of the FETs is connected backward in the direction of current supply.

Because it is required that the first inverter circuit 3a and the second inverter circuit 3b are controlled independently from each other, a first driving circuit 11a for driving the first inverter circuit 3a and a second driving circuit 11b for driving the second inverter circuit 3b are provided. CPU10 has a first CPU (referred to as CPU1, hereinafter) and a second CPU (referred to as CPU2, hereinafter); CPU1 provides a control command to the first driving circuit 11a, and CPU2 provides a control command to the second driving circuit 11b. CPU1 and CPU2 work in mutual cooperation. The output of the foregoing first rotation sensor 9b is inputted to CPU1 by way of an input circuit 12; the output of the second rotation sensor 9c is inputted to CPU2 by way of an input circuit 12.

CPU10 may be formed of a single CPU that provides respective control commands to the first driving circuit and the second driving circuit 11b.

In the integrated electric power steering apparatus, according to Embodiment 1 of the present invention, that is configured in such a manner as described above, when a driver turns on the ignition switch 7, the power-supply circuit 13 is supplied with electric power by the battery 6 so as to generate a predetermined DC constant voltage and to supply the DC constant voltage to CPU10, the input circuit 12, the driving circuit 11, and the like in the control unit 1.

The battery 6 supplies a DC voltage to the first inverter circuit 3a and the second inverter circuit 3b, by way of the filter circuit 17.

Information pieces from the various kinds of sensors 8 such as the vehicle speed sensor and the torque sensor, and the output of the first rotation sensor 9b and the output of the second rotation sensor 9c are inputted to CPU10 by way of the input circuit 12. Based on these inputted information pieces, each of CPU1 and CPU2 in CPU10 calculates a control amount for supplying electric power to the electric motor 2. A first control command based on the result of the calculation by CPU1 is provided to the first driving circuit 11a; a second control command based on the result of the calculation by CPU2 is provided to the second driving circuit 11b.

Based on the first control command from CPU1, the first driving circuit 11a performs PWM driving of the upper arm switching devices and the lower arm switching devices of the respective phases, such as the U-phase upper arm switching device 31U and the U-phase lower arm switching device 32U, in the first inverter circuit 3a and the like. Similarly, based on the second control command from CPU2, the second driving circuit 11b performs PWM driving of the upper arm switching devices and the lower arm switching devices of the respective phases in the second inverter circuit 3b.

The first inverter circuit 3a supplies electric power to the first armature winding 201 of the electric motor 2, by way of the U-phase opening/closing switching device 34U, the V-phase opening/closing switching device 34V, and the W-phase opening/closing switching device 34W; the second inverter circuit 3b supplies electric power to the second armature winding 202 of the electric motor 2, by way of the U-phase opening/closing switching device, the V-phase opening closing switching device, and the W-phase opening/closing switching device. When undergoing a rotating magnetic field generated by the first armature winding 201 and the second armature winding 202, the rotor of the electric motor 2 produces predetermined rotation torque so as to assist the driver's steering.

The voltage values and current values at respective portions of the first inverter circuit 3a and the second inverter circuit 3b and the information pieces on the rotation angle of the rotor of the electric motor 2 from the first rotation sensor 9b and the second rotation sensor 9c are transferred to CPU1 and CPU2 by way of the input circuit 12. Based on these transferred information pieces, CPU1 performs feedback control of the first inverter circuit 3a and CPU2 performs feedback control of the second inverter circuit 3b.

In the case where a failure occurs in the first inverter circuit 3a or in the case where a failure occurs in the first armature winding 201, commands from CPU1 forcibly turn off the first power-source switching device 5a and/or the electric-motor switching devices 34U, 34V, and 34W, so that the first inverter circuit 3a and/or the first armature winding 201 can be disconnected from the battery 6.

Similarly, in the case where a failure occurs in the second inverter circuit 3b or in the case where a failure occurs in the second armature winding 202, commands from CPU2 forcibly turn off the second power-source switching device 5b and/or the electric-motor switching devices, so that the second inverter circuit 3b and/or the second armature winding 202 can be disconnected from the battery 6.

Furthermore, even when the battery 6 is connected in such a way that the polarity thereof is reversed, the parasitic diodes in the first power-source switching device 5a and the second power-source switching device 5b cut off the lines in which the respective currents of the first inverter circuit 3a and the second inverter circuit 3b flow, so that the first inverter circuit 3a and the second inverter circuit 3b can be protected.

The switching devices of the respective phases, such as the U-phase upper arm switching device 31U and the U-phase lower arm switching device 32U, in the first inverter circuit 3a are PWM-driven based on the commands from CPU1; noise signals generated through the PWM driving are suppressed by the first capacitor 30a and the second capacitor 30b. Similarly, the switching devices of the respective phases in the second inverter circuit 3b are PWM-driven based on the commands from CPU2; noise signals generated through the PWM driving are suppressed by the third capacitor 30c and the fourth capacitor 30d.

The voltages and/or currents at the respective connection points between the upper arm switching devices and the lower arm switching devices of the respective phases, such as the connection point between the U-phase upper arm switching device 31U and the U-phase lower arm switching device 32U and the like, the voltages and/or currents at the shunt resistors of the respective phases, such as the U-phase shunt resistor 33U and the like, and the respective inter-winding-terminal voltages and/or currents of the first U-phase winding U1, the first V-phase winding V1, and the first W-phase winding W1 of the first armature winding 201 in the first inverter circuit 3a are transferred to CPU1; the difference between a control command value (target value) and the actual current or voltage value is comprehended, and then so-called feedback control and a fault determination are performed. The information, on the rotation angle of the rotor in the electric motor 2, that is detected by the first rotation sensor 9b is transferred to CPU1; the rotation position and/or the rotation speed of the electric motor is calculated and then is utilized in the feedback control of the first inverter circuit 3a and the like.

The voltages and/or currents at the respective connection points between the upper arm switching devices and the lower arm switching devices of the respective phases, the voltages and/or currents at the shunt resistors of the respective phases, and the respective inter-winding-terminal voltages and/or currents of the second U-phase winding U2, the second V-phase winding V2, and the second W-phase winding W2 of the second armature winding 202 in the second inverter circuit 3b are transferred to CPU2; the difference between a control command value (target value) and the actual current or voltage value is comprehended, and then so-called feedback control and a fault determination are performed. The information, on the rotation angle of the rotor in the electric motor 2, that is detected by the second rotation sensor 9c is transferred to CPU2; the rotation position and/or the rotation speed of the electric motor is calculated and then is utilized in the feedback control of the second inverter circuit 3b and the like.

Figure 2:
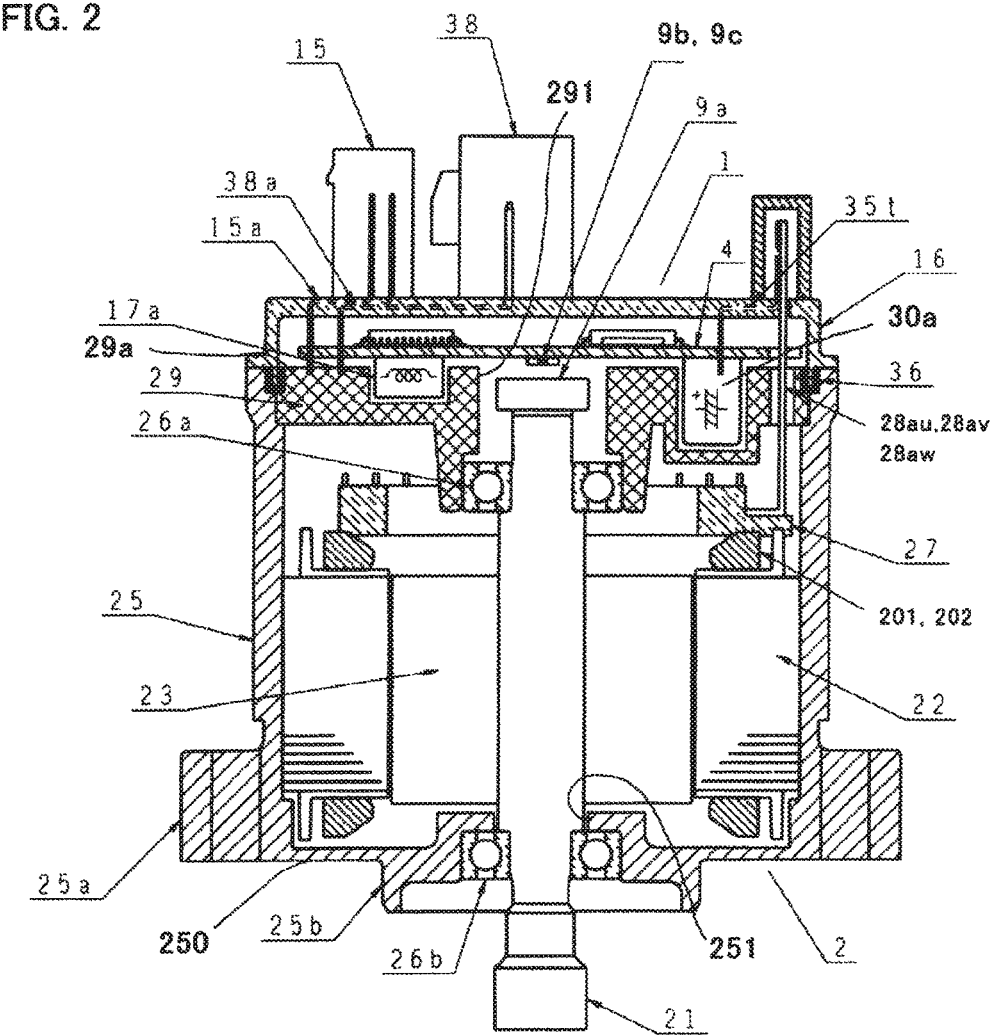
FIG. 2 is a cross-sectional view of the integrated electric power steering apparatus according to Embodiment 1 of the present invention.

FIG. 2 is a cross-sectional view of the integrated electric power steering apparatus according to Embodiment 1 of the present invention; FIG. 2 illustrates the longitudinal cross section of the integrated electric power steering apparatus in which the electric motor 2 and the control unit 1 having the foregoing circuit configuration are integrated. In FIG. 2, the electric motor 2 is situated at the lower part of the drawing; the control unit 1 is situated at the upper part of the drawing. The electric motor 2 and the control unit 1 are integrated with each other in such a way as to be arranged coaxially on the axis line of the output shaft 21 of the electric motor 2.

An electric-motor case 25 that is made of meatal and formed in the shape of a cylindrical tube has an end wall portion 250 in which a mounting flange portion 25 for mounting the integrated electric power steering apparatus in a mechanism portion or the like of a vehicle and a connection portion 25b for mechanically connecting the integrated electric power steering apparatus with a speed reducer (unillustrated) are integrally formed. The electric-motor case 25 is preferably formed of, for example, aluminum, when the heat radiation performance and the outer shape thereof are taken into consideration. A stator 22 and a rotor 23 of the electric motor 2 are contained in the electric-motor case 25. The output-side end portion in the axis direction of the output shaft 21 of the electric motor 2 is pivotably supported by a first bearing 26b mounted in an end wall portion through-hole 251 provided in the radial-direction middle portion of the end wall portion 250, penetrates the end wall portion through-hole 251, and protrudes toward the speed reducer.

The main body of the electric motor 2 is provided with the output shaft 21, the rotor 23 having two or more pairs of permanent-magnet magnetic-field poles arranged on the outer circumferential surface of the output shaft 21, and the stator 22 whose inner circumferential surface faces the outer circumferential surface of the rotor 23 through a gap. The first armature winding 201 and the three-phase second armature winding 202, which are each in three-phase Y-connection, are mounted on the stator 22. A connection ring 27 that is formed in the shape of a ring and is configured by molding connecting conductors with resin, is disposed in the immediate vicinity of the axle-direction ends of the first armature winding 201 and the second armature winding 202.

Winding terminals 28au, 28av, and 28aw of the three windings of the respective phases in the first armature winding 201 and winding terminals 28bu, 28bv, and 28bw of the three windings of the respective phases in the second armature winding 202 (refer to FIGS. 4A and 4B) are electrically connected with the respective connecting conductors of the connection ring 27 and are pulled out from the axel-direction endface of the connection ring 27 toward the control unit 1. In FIG. 2, for the sake of avoiding the complexity of the drawing, only the foregoing winding terminals 28au, 28av, and 28aw of the three windings of the respective phases in the first armature winding 201 are illustrated; the illustration of the winding terminals 28bu, 28bv, and 28bw of the three windings of the respective phases in the second armature winding 202 is omitted.

A frame 29 is mounted in such a way as to be inscribed to the end portion, at the anti-speed-reducer side in the axel direction, of the electric-motor case 25. The frame 29 is also made of metal; a second bearing 26a is mounted in a frame through-hole 291 formed in the radial-direction middle portion of the frame 29. The end portion, at the anti-output side, of the output shaft 21 of the electric motor 2 is pivotably supported by the second bearing 26a. A rotation sensor rotor 9a, described above, is fixed on the end portion at the anti-output side, of the output shaft 21 of the electric motor 2. The frame 29 has six through-holes through which winding terminals penetrate; the foregoing three winding terminals 23au, 28av, and 28aw of the first armature winding 201 and the winding terminals 28bu, 28bv, and 28bw of the three windings of the respective phases in the second armature winding 202 penetrate these respective through-holes and extend toward a wiring board 4, described later.

The frame 29 has two or more functions such as a function as a diaphragm for separating the electric motor 2 from the control unit 1 and a function of holding the second bearing 26a. Furthermore, the frame 29 also has a function as a heat sink for radiating the heat of the control unit 1. As described above, because the frame 29 has a great number of functions, the number of components can be reduced.

As described above, the electric motor 2 has a structure in which the electric-motor case 25 contains the output shaft 21, the rotor 23, the stator 22, the first armature winding 201, the second armature winding 202, the connection ring 27, the frame 29, the first bearing 26b, and the second bearing 26a. Accordingly, the electric motor 2 can be assembled separately from the control unit 1. The electric motor 2 and the control unit 1 are assembled separately from each other and then are integrated with each other.

Next, the control unit 1 will be explained. As described later, the control unit is configured as a module provided with an inverter circuit including two or more switching devices that each supply an electric current to an electric motor, a CPU that outputs command signals to the inverter circuit, a wiring board on which at least the inverter circuit and the CPU are mounted, a housing that contains the wiring board, and respective connectors that are provided on the housing and connect the control unit with a power source apparatus provided outside the control unit and with sensors for detecting the operation states of the vehicle. The control unit 1 is provided with the wiring board 4 on which the respective electric components included in the circuit of the control unit 1 represented in foregoing FIG. 1 are mounted. The wiring board 4 is disposed in a space enclosed by the foregoing frame 29 and the housing 16. The housing 16 formed of resin or the like in the shape of a plate is fixed to the axel-direction endface of the electric-motor case 25 in such a way that its ring-shaped protruding portion formed in the endface of the axel-direction opening portion thereof is inserted, through the intermediary of an adhesive 36, into a recessed groove configured with a recess portion formed in the inner circumferential surface of the electric-motor case 25 and a recess portion formed in the outer circumferential surface of the frame 29.

CPU 10 consisting of CPU1 and CPU2, the first driving circuit 11a, the second driving circuit 11b, the input circuit 12, the power-supply circuit 13, the first power-source switching device 5a, the second power-source switching device 5b, the first inverter circuit 3a, the second inverter circuit 3b, and the like included in the circuit of the control unit 1 represented in FIG. 1 are arranged on the both sides of the wiring board 4 in a dispersed manner.

The axel-direction endface 29a, at the control unit 1 side, of the frame 29 forms a heat radiation surface for radiating the heat of the heat-generating components such as the first power-source switching device 5a, the second power-source switching device 5b, and the respective switching devices 31U, 32U, 34U, 34V, 34W, and the like in the first inverter circuit 3a and the second inverter circuit 3b; these heat-generating components make contact with the axel-direction endface 29a of the frame 29 so that the heat thereof is radiated. It may be allowed that an insulating and heat-transfer sheet is disposed between these heat-generating components and the axel-direction endface 29a of the frame 29 so that the heat generated by the heat-generating components is radiated to the axel-direction endface 29a of the frame 29, through the intermediary of the sheet.

A power-source connector 38 and a sensor connector 15 are formed on the axel-direction outer endface of the housing 16 in such a way as to be integrated with the housing 16. The power-source connector 38 is utilized for a large-current power source to be connected with the positive electrode (+B) of the battery 6 and the ground; the sensor connector 15 is utilized for the various kinds of sensors to be connected with the respective output terminals of the various kinds of sensors 8. Another connector may be provided in addition to the power-source connector 38 and the sensor connector 15.

The power-source connector 38 incorporates two connector pins; outside the control unit 1, one end of one of the connector pins is connected with the positive-polarity terminal (+B) of the battery 6 and one end of the other one of the connector pins connected with the ground portion of the vehicle. The sensor connector 15 incorporates a plurality of connector pins; outside the control unit 1, respective one ends of those connector pins are connected with the output terminals of the various kinds of sensors.

Power-source system lines 38*a* include two power-source system lines embedded in the resin forming the housing 16, as illustrated by the broken lines. One end of one of the power-source system lines is connected with the positive-polarity terminal (+B) of the battery 6, through the intermediary of the one of the connector pins of the power-source connector 38, and the other end thereof is exposed in the housing 16. One end of the other one of the power-source system lines is connected with a ground-potential portion of the vehicle, through the intermediary of the other one of the connector pins of the power-source connector 38, and the other end thereof penetrates a through-hole in the wiring board 4.

Signal system lines 15*a* include a plurality of signal system lines that penetrate the housing 16 and are arranged in the inner surface of the housing 16. One end of each of the signal system lines 15*a* is connected with corresponding each of the output terminals of the various kinds of sensors 8, through the intermediary of corresponding each of the plurality of the connector pins of the sensor connector 15, and the other end thereof penetrates a through-hole in the wiring board 4.

The filter coil 17*b*, the filter capacitor 17*a*, the first and second capacitors 30*a* and 30*b* of the first inverter circuit 3*a*, and the third and fourth capacitors 30*c* and 30*d* of the second inverter circuit 3*b* are each mounted on a first surface, which is the surface, at the frame 29 side, of the wiring board 4; at least part of them are contained in recess portions provided in the frame 29.

Next, the wiring board 4, the arrangement of the electronic components to be mounted on the wiring board 4, and the wiring of the respective electronic components and the like will be explained. At first, the respective structures of the switching devices, which are heat-generating components, such as the first power-source switching device 5*a*, the second power-source switching device 5*b*, and the respective switching devices 31U, 32U, 34U, 34V, 34W, and the like in the first inverter circuit 3*a* and the second inverter circuit 3*b* in the control unit 1 will be explained below.

Figure 3A:
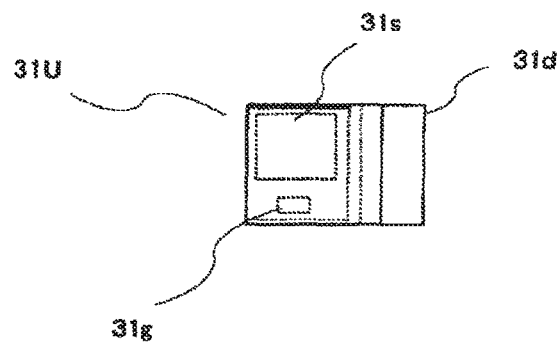
FIG. 3A is a plan view of a switching device in the integrated electric power steering apparatus according to Embodiment 1 of the present invention.
Figure 3B:
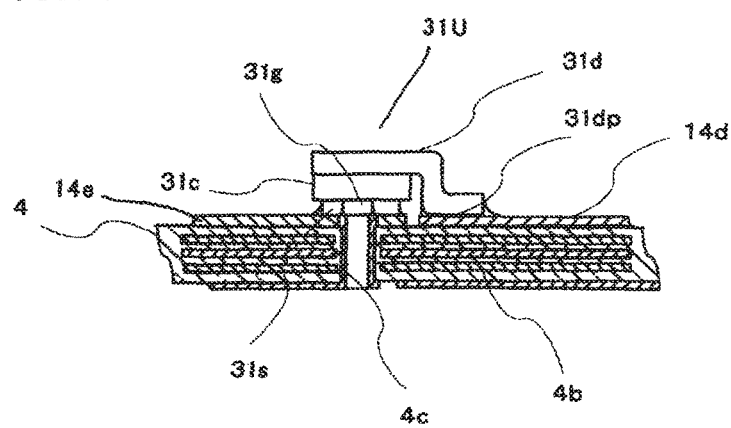
FIG. 3B is a cross-sectional view of the switching device in the integrated electric power steering apparatus according to Embodiment 1 of the present invention.

FIG. 3A is a plan view of a switching device in the integrated electric power steering apparatus according to Embodiment 1 of the present invention; FIG. 3B is a cross-sectional view of a switching device in the integrated electric power steering apparatus according to Embodiment 1 of the present invention. Each of FIGS. 3A and 3B illustrates the U-phase upper arm switching device 31U, as an example, among the foregoing switching devices; however, the other switching devices are each configured in the same manner. In FIGS. 3A and 3B, the U-phase upper arm switching device 31U (referred to only as the switching device, hereinafter) is formed of, for example, a MOSFET and is mounted on a power-source system strip conductor (referred to also as a contact pad) 14*d* formed on the first surface, which is the surface, at the frame 29 side, of the wiring board 4.

A FET chip 31*c* of the switching device 31U is mounted on a plate 31*d* made of, for example, copper; the drain, among the three electric terminals, i.e., the drain, the source, and the gate of the FET, is directly and electrically connected with the copper plate 31*d*. As a result, the copper plate 31*d* is substantially the drain of the FET chip 31*c*. In contrast, the source 31*s* and the gate 31*g* are configured in such a way as to protrude toward the wiring board 4 from the FET chip 31*c*. The surface, at the wiring board 4 side, of the source 31*s*, the surface, at the wiring board 4 side, of the gate 31*g*, and the surface, at the FET chip 31*c* side, of the copper plate 31*d* are substantially on the same plane.

As illustrated in FIG. 3B, the respective surfaces, at the wiring board 4 side, of the gate 31*g* and the source 31*s* are electrically connected with the power-source system strip conductor 14*d* of the wiring board 4; the surface 31*dp*, at the wiring board 4 side, of the drain 31*d* is also electrically connected with the power-source system strip conductor 14*d* through soldering or the like. The wiring board 4 is a multi-layer substrate; the power-source system strip conductor 14*d* is formed on the first surface, which is the surface thereof at the frame 29 side. Three wiring strip conductors 4*b*, which are inner layers, are formed inside the wiring board 4; moreover, a wiring strip conductor 4*e*, which is an outer layer, is formed on a second surface, which is the surface, at the anti-frame 29 side, of the wiring board 4. The gate 31*g* of the FET chip 31*c* is electrically connected with a pier 4*c* formed in a through-hole of the wiring board 4 through, for example, soldering and then is electrically connected with the driving circuit 11 represented in FIG. 1, through the intermediary of the wiring strip conductor 4*e*, which is an outer layer connected electrically with the pier 4*c*.

Figure 4A:
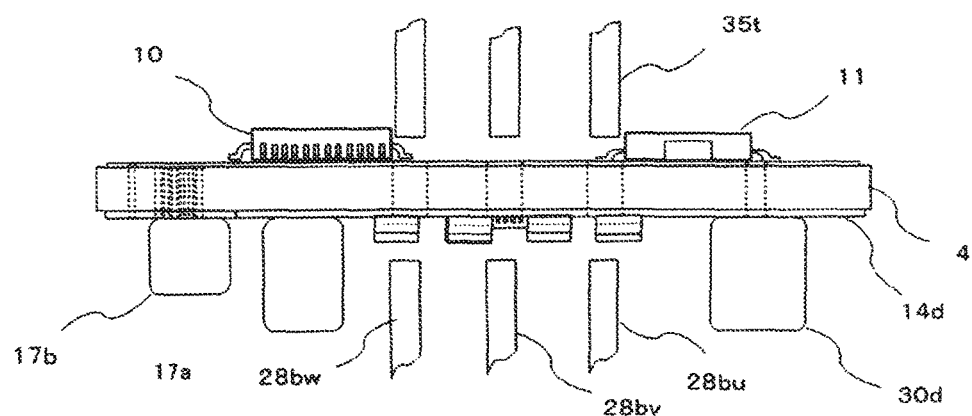
FIG. 4A is a side view of a wiring board, on which switching devices and the like have been mounted, in the integrated electric power steering apparatus according to Embodiment 1 of the present invention.
Figure 4B:
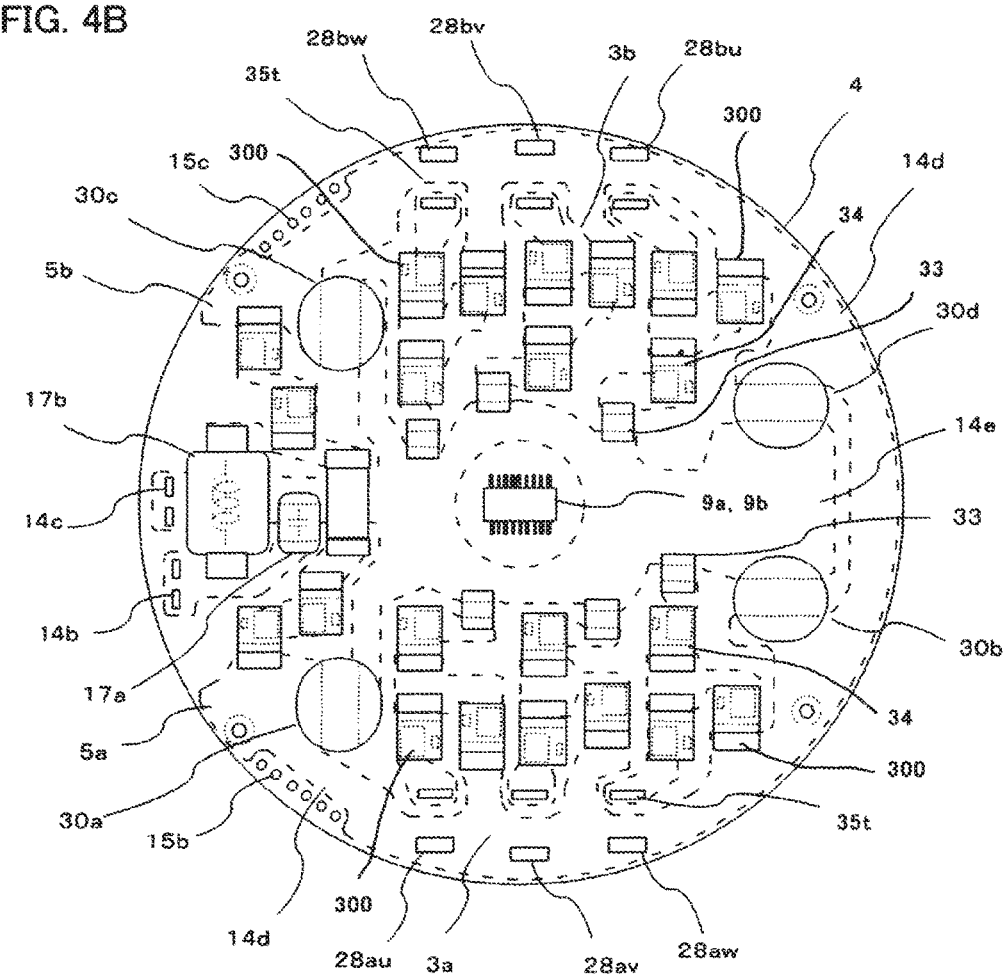
FIG. 4B is a plan view of a wiring board, on which switching devices and the like have been mounted, in the integrated electric power steering apparatus according to Embodiment 1 of the present invention.

Next, the structure of the wiring board 4 and the arrangement the electronic components such as the switching devices on the wiring board 4 will be explained. FIG. 4A is a side view of the wiring board, on which the switching devices and the like have been mounted, in the integrated electric power steering apparatus according to Embodiment 1 of the present invention; FIG. 4B is a plan view of the wiring board, on which the switching devices and the like have been mounted, in the integrated electric power steering apparatus according to Embodiment 1 of the present invention. As far as the wiring board 4 illustrated in FIGS. 4A and 4B is concerned, a plurality of power-source system strip conductors, ground system strip conductors, and wiring strip conductors for electrically connecting and wiring the respective electronic components are bonded around on a single wiring board 4.

In order to efficiently connecting a great number of portions, at first, the wiring board 4 is formed of a multi-laver substrate, as described above; on the first surface at the frame 29 side, there are bonded the power-source system strip conductor 14*d* and a ground system strip conductor 14*e* that are each formed of copper foil whose thickness is larger than that of each of the other layers. The power-source system strip conductor 14*d*, which is disposed on the first surface of the discoidally formed wiring board 4, is situated substantially along the outer circumferential edge of the wiring board 4, as illustrated by a chain line in FIG. 4B. The ground system strip conductor 14*e*, which is disposed on the first surface of the wiring board 4, is situated inside the power-source system strip conductor 14*d*, as illustrated by a broken line in FIG. 4B.

A power-source system line terminal 14*b* is connected with the positive-polarity terminal (+B) of the battery 6, through the intermediaries of the connector pin of the power-source connector 38 and the power-source system line 38a, illustrated in FIG. 2. The power-source system strip conductor 14d is electrically connected with the power-source system line terminal 14b; the voltage at the positive-polarity terminal (+B) of the battery 6 is applied to the power-source system strip conductor 14d. A power-source system line terminal 14c is connected with the negative-polarity terminal of the battery 6, i.e., a ground-potential portion of the vehicle, through the intermediaries of the connector pin of the power-source connector 38 and the power-source system line 38a, illustrated in FIG. 2. The ground system strip conductor 14e is electrically connected with the power-source system line terminal 14c, so that the potential thereof is held at the ground potential.

As illustrated in FIG. 4B, the power-source system line terminals 14b and 14c are collectively arranged in the vicinity of the outer circumferential edge of the wiring board 4, through the intermediaries of the power-source system lines 38a extending from the connector pins of the connector 38 illustrated in FIG. 2. Taking the current capacity into consideration, two terminals each are provided as each of the power-source system line terminals 14b and 14c. In contrast, signal system line terminals 15b and 15c are connected with the corresponding signal system lines 15a extending from the connector pins of the sensor connector 15 and are arranged separately at two places in the vicinity of the outer circumferential edge of the wiring board 4 in such a way as to be spaced apart from the power-source system line terminals 14b and 14c. The signal system line terminal 15b is connected with CPU1 by way of the input circuit 12; the signal system line terminal 15c is connected with CPU2 by way of the input circuit 12.

As represented in the circuit configuration in FIG. 1, the power-source system strip conductor 14d to which the positive-polarity terminal voltage +B of the battery 6 is applied is electrically connected, at first, with the filter coil 17b and the filter capacitor 17a in the filter circuit 17 through wiring. Next, the power-source system strip conductor 14d is connected with the first power-source switching device 5a and the second power-source switching device 5b that are arranged in such a way as to flank the filter coil 17b and the filter capacitor 17a and to be adjacent thereto. Each of the first power-source switching device 5a and the second power-source switching device 5b is configured by serially connecting two switching devices formed of a FET illustrated in FIGS. 3A and 3B, as represented in FIGS. 1 and 4B.

As illustrated in FIG. 4B, the winding terminals 28au, 28av, and 28aw of the first armature winding 201 and the winding terminals 28bu, 28bv, and 28bw of the second armature winding 202 penetrate the vicinities of the outer circumferential edge of the wiring board 4 at the respective places that face each other in such a way as to flank the middle portion of the wiring board 4. Each of the winding terminals 28au, 28av, and 28aw and the winding terminals 28bu, 28bv, and 28bw is connected with a welding wiring lead 35t through welding. The three welding wiring leads 35t connected with the winding terminals 28au, 28av, and 28aw through welding penetrate the wiring board 4 from the first surface to the second surface thereof at the vicinities of the respective corresponding winding terminals. Similarly, the three welding wiring leads 35t connected with the winding terminals 28bu, 28bv, and 28bw through welding penetrate the wiring board 4 from the first surface to the second surface thereof at the vicinities of the respective corresponding winding terminals.

The first rotation sensor 9b and the second rotation sensor 9c are arranged at the middle portion of the wiring board 4 and are situated in such a way that as illustrated in FIG. 2, they face the rotation sensor rotor 9a fixed to the axel-direction end portion of the output axel 21 of the electric motor 2 and are spaced a predetermined gap apart from the rotation sensor rotor 9a in the axel direction. When noise signals intrude in the respective outputs of the first rotation sensor 9b and the second rotation sensor 9c, the rotation angle cannot accurately be detected; when inaccurate rotation angle information is inputted to CPU10, it is not made possible to accurately rotate the rotor 23 of the electric motor 2. Thus, it is required to pay attention to preventing noise from intruding in the output of the rotation sensor unit 9.

The noise sources of noise signals that each may provide the largest effect to the output of the rotation sensor unit 9 are the switching devices such as the first and second power-source switching devices 5a and 5b that perform on/off-switching of a large current and the switching devices 31U, 32U, 34U, 34V, 34W, and the like in the first and second inverter circuits 3a and 3b and the winding terminals 28au, 28av, and 28aw of the first armature winding 201 and the winding terminals 28bu, 28bv, and 28bw of the second armature winding 202 that are connected with those switching devices.

As measures for cutting off the rotation sensor unit 9 from noise, there is conceived a structure in which the rotation sensor rotor 9a, the first rotation sensor 9b, and the second rotation sensor 9c are shielded by a metal wall. Accordingly, the ground system strip conductor 14e whose potential is held at the ground potential is disposed on the first surface, which is the surface, at the frame side, of the wiring board 4, in such a way as to enclose the rotation sensor unit 9, so that the ground system strip conductor 14e formed of large-thickness copper foil is made to have a function as the metal wall for enclosing the rotation sensor unit 9. The first rotation sensor 9b and the second rotation sensor 9c are arranged in such a way as to be on a plane that is substantially the same as that of the ground system strip conductor 14e. The ground system strip conductor 14e extends from the two terminal holes that are penetrated by the power-source system line terminals 14b and 14c and is bonded around along the middle portion of the wiring board 4; the ground system strip conductor 14e is configured in such a way that the wiring length thereof is as short as possible and is formed in such a way as to be a large-width strip conductor.

The first capacitor 30a and the second capacitor 30b in the first inverter circuit 3a are arranged in the lower part of FIG. 4B in such a way as to flank the power-source system strip conductor 14d and the ground system strip conductor 14e, and are electrically connected between the power-source system strip conductor 14d and the ground system strip conductor 14e. The third capacitor 30c and the fourth capacitor 30d in the second inverter circuit 3b are arranged in the upper part of FIG. 4 in such a way as to flank the power-source system strip conductor 14d and the ground system strip conductor 14e, and are electrically connected between the power-source system strip conductor 14d and the ground system strip conductor 14e.

The shunt resistors 33 such as the first U-phase shunt resistor 33U and the like in the first inverter circuit 3a and the respective shunt resistors 33 in the second inverter circuit 3b are arranged in the vicinity of the middle portion of the first surface of the wiring board 4; one of the terminals of each of those shunt resistors 33 is electrically connected with the ground system strip conductor 14e.

The six switching devices 300 in the first inverter circuit 3a and the six switching devices 300 in the second inverter circuit 3b are arranged as illustrated in FIG. 4B on the first surface of the wiring board 4. The three electric-motor switching devices 34 in the first inverter circuit 3a and the three electric-motor switching devices 34 in the second inverter circuit 3b are arranged as illustrated in FIG. 4B on the first surface of the wiring board 4. As described above, the respective groups of the switching devices of three phases in the first inverter circuit 3a and the second inverter circuit 3b are arranged in a concentrated manner. These switching devices are arranged between the power-source system strip conductor 14d and the ground system strip conductor 14e in such a way that the switching devices of each of the respective phases are oriented to the same direction; thus, each of the respective electric connections can be performed as short as possible.

As illustrated in FIG. 2, each of the six winding terminals 28au, 28av, 28aw, 28bu, 28bv, and 28bw of the electric motor 2 penetrates the wiring board 4 and the housing 16 and then is welded to the welding wiring lead 35t. As illustrated in FIGS. 2 and 4A, the welding wiring lead 35t passes through the top board of the housing 16 and then extends downward in the drawing; the front-end portion thereof penetrates the hole in the wiring board 4. As illustrated in FIG. 2, each of the six winding terminals 28au, 28av, 28aw, 28bu, 28bv, and 28bw of the electric motor 2 and corresponding each of the six welding wiring leads 35t are connected with each other through welding at the outside of the housing 16; thus, the connection space in the housing 16 can be reduced and hence the inner space of the housing 16 can effectively be utilized.

Each of the power-source system line terminals 14b and 14c, the signal system line terminals 15b and 15c, and the welding wiring leads 35t substantially vertically protrudes from the inner wall surface of the housing 16 toward the wiring board 4, penetrates the through-hole in the wiring board 4, protrudes to the second surface of the wiring board 4, and then is soldered to corresponding each of the electronic components. As described above, the power-source system line terminals 14b and 14c, the signal system line terminals 15b and 15c, and the welding wiring leads 35t are arranged in such a way as to penetrate the wiring board 4 from the power-source connector 38 and the sensor connector 15 provided on the housing 16 toward the electric motor 2; thus, it is made possible to solder these wiling leads from one of the sides of the wiring board 4, i.e., from the first surface, which is the surface, at the electric motor 2, of the wiring board 4 and hence the assembly man-hour can be reduced.

Corresponding to the first armature winding 201 and the second armature winding 202, the respective welding wiring leads 35t are arranged between the power-source system strip conductor 14d and the ground system strip conductor 14e at two places of the wiring board 4. The respective welding wiring leads 35t corresponding to the first armature winding 201 are arranged at the radial-direction outer side of the wiring board 4 with respect to the switching devices 300 of the first inverter circuit 3a and the electric-motor switching devices 34. Similarly, the respective welding wiring leads 35t corresponding to the second armature winding 202 are arranged at the radial-direction outer side of the wiring board 4 with respect to the switching devices 300 of the second inverter circuit 3b and the electric-motor switching devices 34.

The foregoing arrangement of the welding wiring leads 35t makes it possible that the distances among the welding wiring lead 35t, the power-source system strip conductor 14d, and the ground system strip conductor 14e are shortened as much as possible. Furthermore, the welding wiring leads 35t can be arranged in a concentrated manner, corresponding to the winding terminals 28au, 28av, and 28aw of the first armature winding 201 and the winding terminals 28bu, 28bv, and 28bw of the second armature winding 202. Furthermore, in order to suppress noise to the rotation sensor unit 9, the winding terminals 28au, 28av, and 28aw of the first armature winding 201 and the winding terminals 28bu, 28bv, and 28bw of the second armature winding 202 are arranged in such a way as to be substantially in point symmetry with each other with respect to the rotation sensor unit 9. The welding wiring lead 35t corresponding to the first armature winding 201 and the welding wiring lead 35t corresponding to the second armature winding 202 are arranged in such a way as to be substantially in point symmetry with each other with respect to the rotation sensor unit 9.

The first and second capacitors 30a and 30b are arranged in the vicinity of the first inverter circuit 3a, and the third and fourth capacitors 30c and 30d are arranged in the vicinity of the second inverter circuit 3b; the respective capacitors are arranged between the power-source system strip conductor 14d and the ground system strip conductor 14e. Therefore, the connection between each of the capacitors, the power-source system strip conductor 14d, and the ground system strip conductor 14e can be performed with the shortest distance.

In each of the switching devices 300, the power-source switching devices 5a and 5b, and the electric-motor switching devices 34, the copper plate 31d is the drain of the FET chip 31c, as illustrated in FIGS. 3A and 3B; the respective drains of the switching devices protrude from the first surface of the wiring board 4 toward the frame 29 in such a way as to have the same height The respective drains, made of copper plate 31d, of these all switching devices 300, 5a, 5b, and 34 abut against the surface of the frame 29 and are directly cooled by the frame 29 having the function as a heat sink.

On the second surface (the surface at the upper part of FIG. 4A) of the wiring board 4, CPU10 consisting of CPU1 and CPU2, the first driving circuit 11a, the second driving circuit 11b, and the like are mounted. As described above, the wiring leads, for relatively small currents, that are in the vicinity of CPU10 and the like and the wiring leads, for relatively large currents, that are in the vicinity of the switching devices 300 and the like are arranged separately on the second surface and the first surface, respectively, of the wiring board 4; thus, arrangement in which heat generation, noise, and the like have been taken into consideration can be realized.

As described above, because the respective switching devices are arranged in a concentrated manner, the heat radiation performance of each of the switching devices can be secured and a free area can be provided in the area on the surface of the wiring board 4; thus, relatively large components such as the capacitors 30a, 30b, 30c, and 30d and the filter coil 17b can be arranged in a dispersed manner. Small-current electronic components such as CPU10 consisting of CPU1 and CPU2, the first driving circuit 11a, and the second driving circuit 11b are connected with the signal system line terminals 15b and 15c and the like, by utilizing the inner layer and the second surface of the wiring board 4.

After the electric motor and the control unit are integrated with each other, the winding terminals of the electric motor and the wiring members are connected with each other through welding at the outside of the housing.

As described above, the power-source system strip conductor 14*d* and the ground system strip conductor 14*e* in which relatively-large currents flow are arranged on the first surface of the wiring board 4, and the ground system strip conductor 14*e* is disposed inside the power-source system strip conductor 14*d* in a ring-shaped manner; in a concentrated manner, the respective switching devices are arranged between these strip conductors; electronic components such as CPU10 and the like, in which relatively-small currents flow, are arranged on the second surface, of the wiring board 4, that is opposite side of the first surface thereof. As a result, a great number of components can efficiently be arranged and can be electrically connected in an efficient manner on a single wiring board 4.

The power-source system strip conductor 14*d* and the ground system strip conductor 14*e* in which relatively-large currents flow are arranged on the first surface, which is the surface of one of the outer sides of the wiring board 4; thus, in comparison with the case where these strip conductors are formed on the inner layer of the wiring board 4, the heat radiation performance for heat generated by the power-source system strip conductor 14*d* and the ground system strip conductor 14*e* per se can be raised. Moreover, the respective surfaces of the drains, as the respective surfaces of the switching devices, are at the same height from the surface of the wiring board 4; thus, it is made possible to readily make the respective surfaces of the switching devices abut against the surface of the frame 29 having the function as a heat sink.

Furthermore, the respective switching devices are arranged in a concentrated manner, so that the distance between the components is shortened and hence the wiring strip conductor therebetween is shortened; thus, there is provided an effect that the loss caused by the wiring strip conductor can be reduced. Because this effect can reduce the temperature rise of the wiring board, the temperature of the switching device whose generated heat causes a trouble can also be reduced and hence the life time of the power steering apparatus can be prolonged.

Embodiment 2

Figure 5:
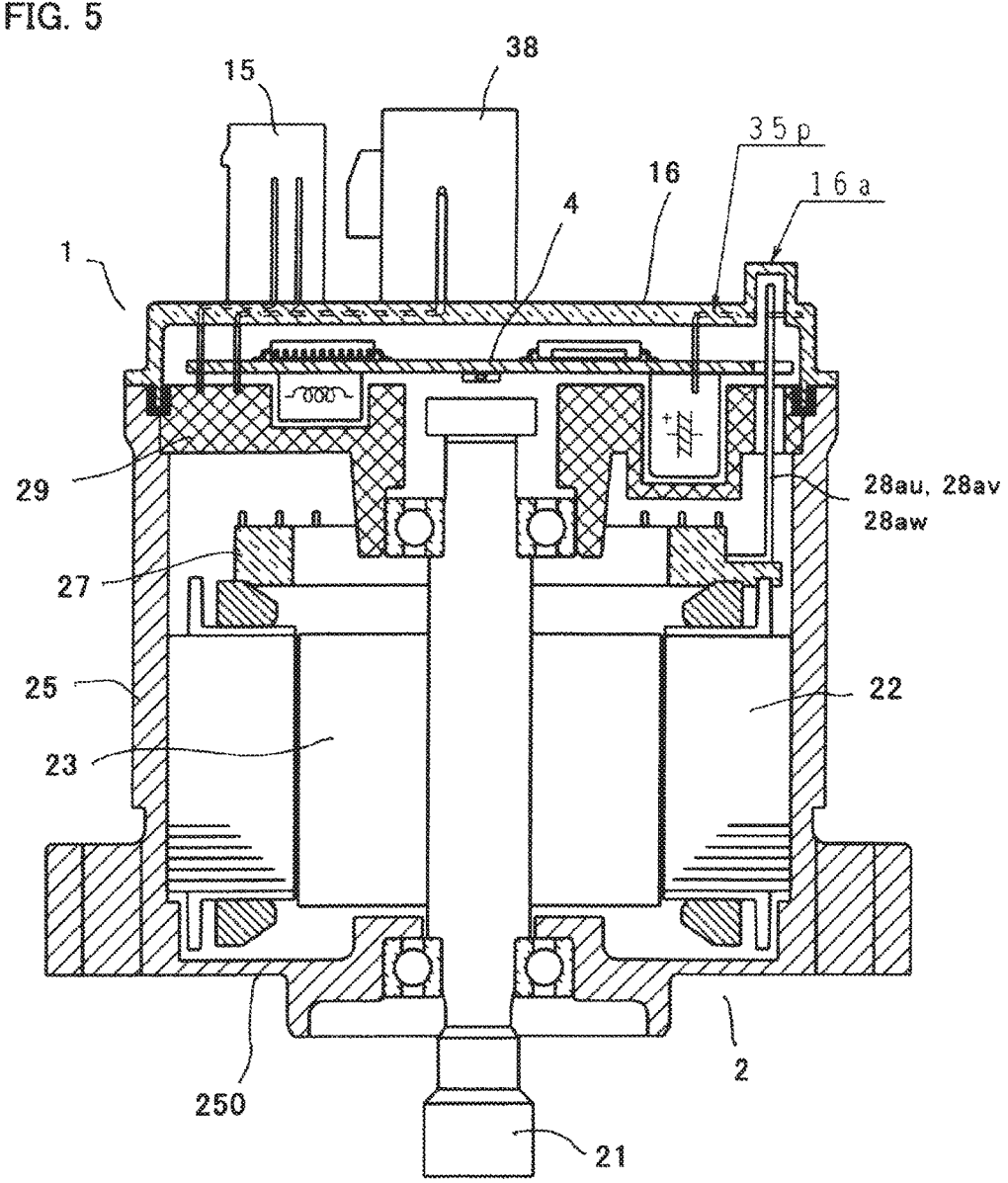
FIG. 5 is a cross-sectional view of an integrated electric power steering apparatus according to Embodiment 2 of the present invention.

Next, an integrated electric power steering apparatus according to Embodiment 2 of the present invention will be explained. FIG. 5 is a cross-sectional view of the integrated electric power steering apparatus according to Embodiment 2 of the present invention. In foregoing Embodiment 1, the respective winding terminals of the first armature winding and the second armature winding of the electric motor are connected with the corresponding welding wiring leads through welding; however, in Embodiment 2, the respective winding terminals of the first armature winding and the second armature winding of the electric motor are connected with corresponding press-fit wiring leads 35*p* through press-fitting; in this respect, the integrated electric power steering apparatus according to Embodiment 2 differs from the integrated electric power steering apparatus according to Embodiment 1.

That is to say, in FIG. 5, the press-fit wiring lead 35*p* is disposed inside the housing 16; when the electric motor 2 and the control unit 1, which are assembled separately from each other, are integrated with each other in the final process, the winding terminals 28*au*, 28*av*, and 28*aw* of the first armature winding 201 and the winding terminals 28*bu*, 28*bv*, and 28*bw* (unillustrated) of the second armature winding 202 of the electric motor 2 are electrically and mechanically connected with the corresponding press-fit wiring leads 35*p* through press-fitting. The other configurations are the same as those of the integrated electric power steering apparatus according to foregoing Embodiment 1.

As described above, because the press-fit wiring lead 35*p* is disposed inside the housing 16, no extra wiring components are required and hence the apparatus can be downsized. When each of the winding terminals 28*au*, 28*av*, 28*aw*, 28*bu*, 28*bv*, and 28*bw* and the corresponding press-fit wiring lead 35*p* are press-fit to each other, it is required to press, with a large load, each of the winding terminals 28*au*, 28*av*, 28*aw*, 28*bu*, 28*bv*, and 28*bw* into the corresponding press-fit wiring lead 35*p*; however, because the load care be received by making assembly equipment abut against the outer side of the housing 16, for example, the outer endface 16*a* of the housing 16, the foregoing press-fitting work can readily be implemented.

Embodiment 3

Next, an integrated electric power steering apparatus according to Embodiment 3 of the present invention will be explained. In foregoing Embodiment 2, the press-fit wiring leads are provided, and the respective winding terminals of the first armature winding and the second armature winding of the electric motor are connected with corresponding press-fit wiring leads through press-fitting; however, in Embodiment 3, no press-fit wiring lead is provided, and the respective winding terminals of the first armature winding and the second armature winding of the electric motor are connected to the wiring board through the intermediaries of through-holes.

In other words, although not illustrated, the integrated electric power steering apparatus according to Embodiment 3 of the present invention is provided with through-holes for inserting the winding terminals 28*au*, 28*av*, 28*aw*, 28*bu*, 28*bv*, and 28*bw* of the electric motor 2 into the wiring board 4. Each of the winding terminals 28*au*, 28*av*, 28*aw*, 28*bu*, 28*bv*, and 28*bw* of the electric motor 2 has a projection, a protrusion, or a wide portion, at its front-end portion, that is along the hole shape of the through-hole in the wiring board 4. Each of the front-end portions of the winding terminals 28*au*, 28*av*, 28*aw*, 28*bu*, 28*bv*, and 28*bw* is inserted into the corresponding through-hole of the wiring board so as to abut against the inner wall of the corresponding through-hole so that each of the winding terminals and a predetermined portion of the wiring board are electrically connected with each other. The other configurations are the same as those of the integrated electric power steering apparatus according to Embodiment 1.

In the case of the integrated electric power steering apparatus according to Embodiment 3, it is required to provide neither the welding wiring lead nor the press-fit wiring lead, and hence the winding terminal can readily be connected with the wiring board, without implementing any welding or press-fitting work.

Embodiment 4

Figure 6:
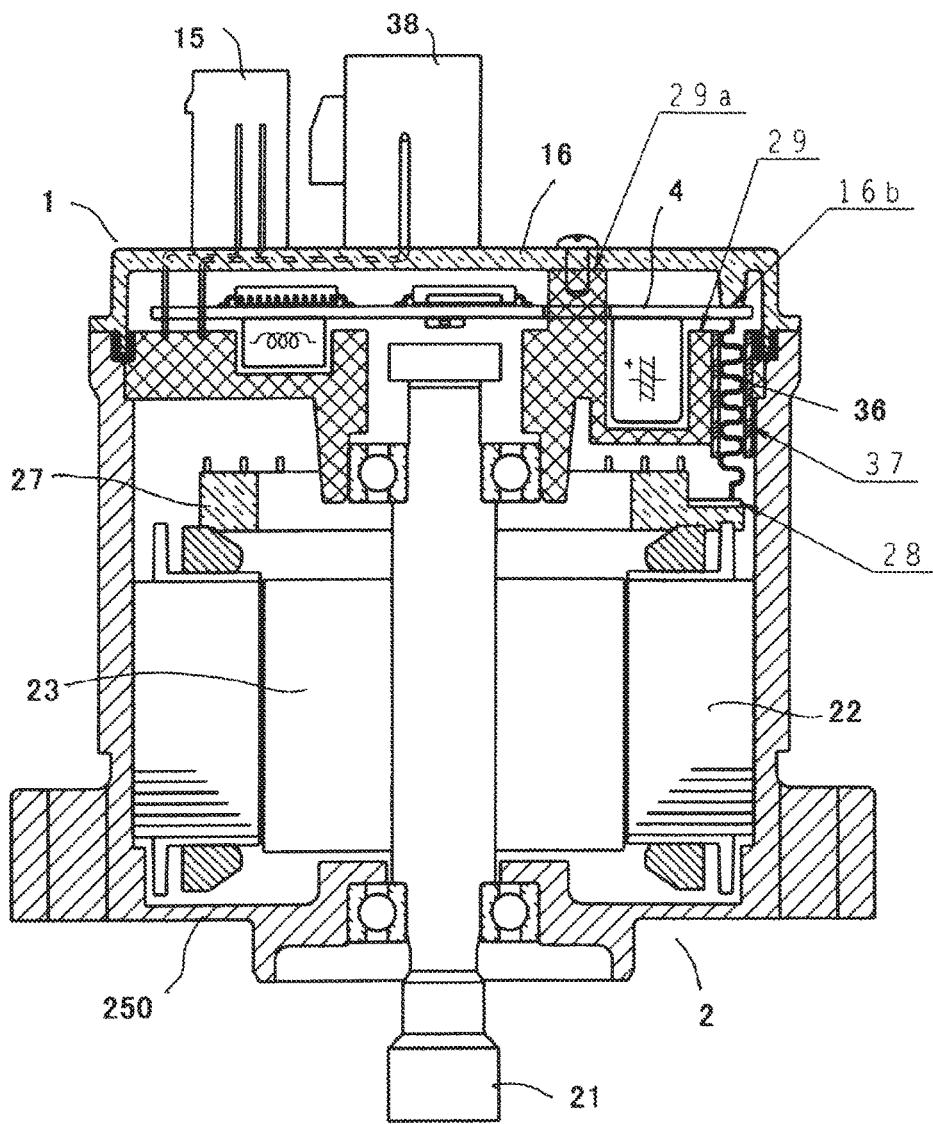
FIG. 6 is a cross-sectional view of an integrated electric power steering apparatus according to Embodiment 4 of the present invention.
Figure 7:
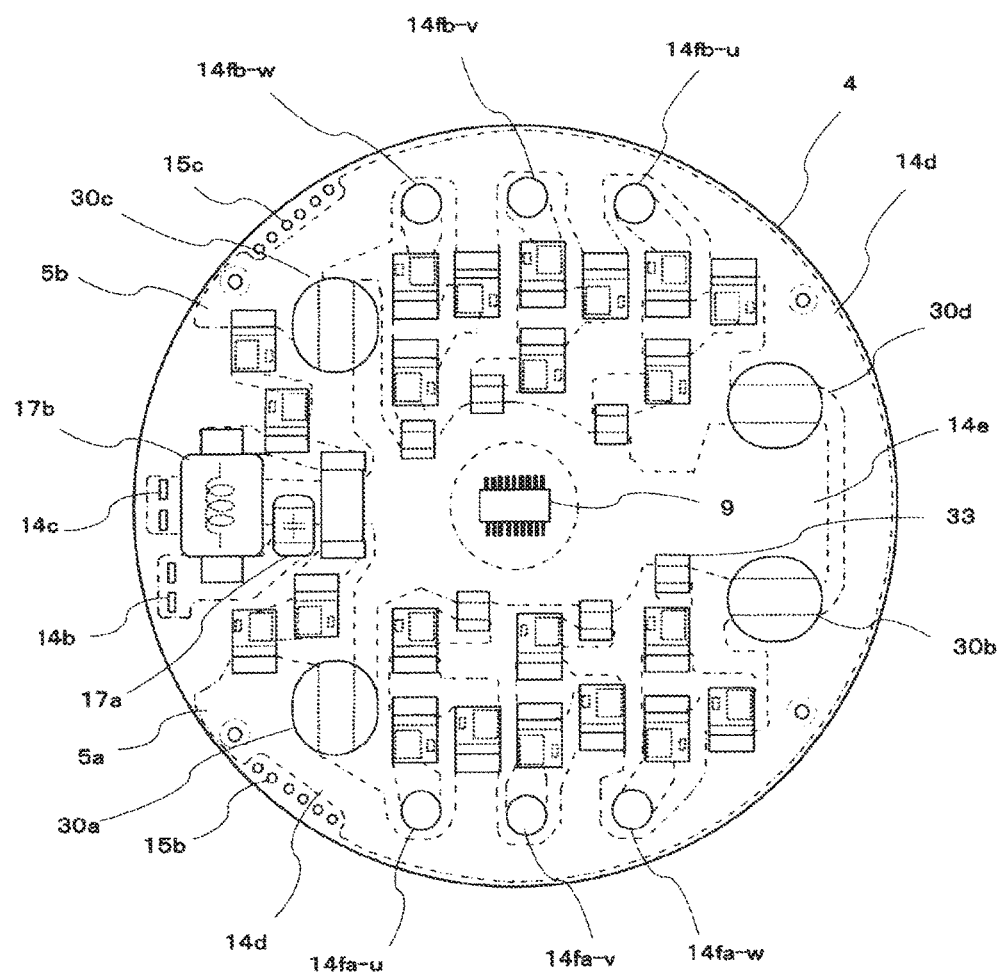
FIG. 7 is a plan view of a wiring board, on which switching devices and the like have been mounted, in the integrated electric power steering apparatus according to Embodiment 4 of the present invention.

Next, an integrated electric power steering apparatus according to Embodiment 4 of the present invention will be explained. FIG. 6 is a cross-sectional view of the integrated electric power steering apparatus according to Embodiment 4 of the present invention; FIG. 7 is a plan view of a wiring board, on which switching devices and the like have been mounted, in the integrated electric power steering apparatus according to Embodiment 4 of the present invent on. In foregoing Embodiment 1, the respective winding terminals of the first armature winding and the second armature winding of the electric motor are connected with the corresponding welding wiring leads through welding; however, in Embodiment 4, the respective winding terminals of the first armature winding and the second armature winding of the electric motor are connected with the wiring board by use of conductive spring members; in this respect, the integrated electric power steering apparatus according to Embodiment 4 differs from the integrated electric power steering apparatus according to Embodiment 1.

In FIGS. 6 and 7, the winding terminals 28au, 28av, and 28aw of the first armature winding 201 and the winding terminals 28bu, 28bv, and 28bw (unillustrated) of the second armature winding 202 are formed in the shape of a ring; each of the flat portions thereof is disposed on the connection ring 27 in such a way as to extend in a direction perpendicular to the axel direction. The winding terminals are separated and are insulated from one another for the respective phases.

The respective six conductive spring members 36 are provided, corresponding to the winding terminals 28au, 28av, and 28aw of the first armature winding 201 and the winding terminals 28bu, 28bv, and 28bw of the second armature winding 202; one end of each of the six conductive spring members 36 abuts against the flat portion of the corresponding winding terminal so as to be electrically connected therewith, and the other end thereof penetrates the frame 29 so as to be electrically connected with the corresponding wiring strip conductor of the wiring board 4.

Each of the six conductive spring members 36 is inserted into a pipe-shaped insulating guide member 37 formed of resin and is insulated from the metal frame 29. The insulating guide member 37 has functions of not only maintaining the insulation between the conductive spring member and the frame 29 but also positioning of the conductive spring member 36 and preventing leaning of the conductive spring member 36 at a time when the spring is contracted.

The respective conductive spring members 36 connected with the corresponding winding terminals 28au, 28av, and 28aw of the first armature winding 201 are inserted into three circular recess portions 14fa-u, 14fa-v, and 14fa-w, formed at the lower part in FIG. 7, in the first surface of the wiring board 4 so as to make direct contact with the corresponding wiring strip conductors of the wiring board 4. The respective conductive spring members 36 connected with the corresponding winding terminals 28bu, 28bv, and 28bw of the first armature winding 202 are inserted into three circular recess portions 14fb-u, 14fb-v, and 14fb-w formed in the first surface, at the upper part in FIG. 7, of the wiring board 4 so as to make direct contact and be electrically connected with the corresponding wiring strip conductors of the wiring board 4.

In the case of the integrated electric power steering apparatus according to Embodiment 4, neither the welding wiring lead in Embodiment 1 nor the press-fit wiring lead in Embodiment 2 is required and hence it is not required that the welding wiring lead or the press-fit wiring lead is made to penetrate the wiring board 4 and then extend up to the rear side of the housing 16; thus, it is made possible to connect each of the wilding terminals with the corresponding wiring strip conductor of the wiring board 4 with the shortest distance.

The conductive spring member 36, as a spring, has an elasticity and is accompanied by reaction force caused by contraction thereof; thus, a housing protruding portion 16b that protrudes toward the electric motor 2 is formed in part of the inner wail portion of the housing 16 and the front-end portion of the housing protruding portion 16b is made to abut against the second surface of the wiring board 4, so that the reaction force caused by contraction of the conductive spring member 36 is prevented from deforming the wiring board 4.

The housing 16 is fixed by a screw or the like to a frame protruding portion 29a that protrudes from the axel-direction endface of the frame 29 toward the anti-electric-motor 2 side; respective stable contact pressures are provided to the point between the one end of the conductive spring member 36 and the corresponding winding terminal and a point between the conductive spring member 36 and the corresponding wiring strip conductor of the wiring board 4, without losing the reaction force caused by contraction of the conductive spring member 36, so that the conductivity therebetween can be secured.

As illustrated in FIG. 7, the circular recess portions 14fa-u, 14fa-v, and 14fa-w and the circular recess portions 14fb-u, 14fb-v, and 14fb-w are formed, and respective the other ends of the six conductive spring members 36 are inserted into these circular recess portions so as to be electrically connected with the corresponding wiring strip conductors of the wiring board; thus, because it is not required that the conductive spring member 36 penetrates the wiring board 4, the mounting area of the wiring board 4 is reduced as little as possible, and soldering is not required; therefore, it is made possible to mount an electronic component or the like in an area on the second surface, of the wiring board 4, that corresponds to the circular recess portion in the first surface, against which the conductive spring member 36 abuts and hence the mounting area on the second surface of the wiring board 4 can be secured much.

In the case of the integrated electric power steering apparatus according to Embodiment 4, after the electric motor 2 and the control unit 1 are assembled separately from each other, each of the six conductive springs is made to fall into the through-hole obtained by mounting the insulating guide member 37 in the frame 29 of the electric motor 2 and then the control unit 1 and the electric motor 2 flank these members, so that the electric connection between the winding terminal and the conductive spring member 36 and the electric connection between the conductive spring member 36 and the wiring strip conductor of the wiring board 4 can be secured. Accordingly, because it is not required to fix the conductive spring member 36 to another member in its vicinity, by means of a screw, TIG welding, or the like, the number of the components in the electric power steering apparatus can be reduced and hence the area for the insertion of a welding jig and the number of screwing points can be reduced; thus, downsizing can be performed.

In the scope of the present invention, the embodiments thereof can appropriately be modified or omitted.

INDUSTRIAL APPLICABILITY

The present invention can be applied to the field of electric power steering and, eventually, the field of the automobile industry.

DESCRIPTION OF REFERENCE NUMERALS

1: control unit 2: electric motor, 21: output shaft, U1: first U-phase winding, V1: first V-phase winding, W1: first W-phase winding, 201: first armature winding, 202: second armature winding, U2: second U-phase winding, V2: second V-phase winding, W2: second W-phase winding, 6: battery, 7: ignition switch, 8: various kinds of sensors, 9: rotation sensor unit, 9a: rotation sensor rotor, 9b: first rotation sensor, 9c: second rotation sensor, 3a: first inverter circuit, 3b: second inverter circuit, 5a: first power-source switching device, 5b: second power-source switching device, 10: CPU, CPU1: 1st CPU, CPU2: second CPU, 11a: first driving circuit, 11b: second driving circuit, 12: input circuit, 13: power-supply circuit, 17: filter circuit, 17b: filter coil, 17a: filter capacitor, 31U: U-phase upper arm switching device, 32U: U-phase lower arm switching device, 300: switching device, 33: shunt resistor, 33U: first U-phase shunt resistor, 34: electric-motor switching device, 34U: U-phase first electric-motor switching device, 34V: V-phase first electric-motor switching device, 34W: W-phase first electric-motor switching device, 30a: first capacitor, 30b: second capacitor, 34c: third capacitor, 30d: fourth capacitor, 25a: mounting flange portion, 22: stator, 23: rotor 25: electric-motor case, 250: end wall portion, 251: end wall portion through-hole, 26b: first bearing, 26a: second bearing, 27: connection ring, 29: frame, 29a: axel-direction end face of frame, 291: frame through-hole, 16: housing, 36: adhesive 38: power-source connector, 15: sensor connector 38a: power-source system line, 15a: signal system line, 14b, 14c: power-source system line terminal, 14d: power-source system strip conductor, 14e: ground system strip conductor, 15b, 15c: signal system line terminal, 31d: plate, 31c: PET chip, 31s: source 31g: gate, 4b, 4e: wiring strip conductor 4c: pier, 28, 28au, 28av, 28aw, 28bu, 28bv, 28bw: winding terminal, 35t: welding wiring lead, 35p: press-fit wiring lead, 36: conductive spring member, 14fa-u, 14fa-v, 14fa-w, 14fb-u, 14fb-v, 14fb-w: circular recess portion, 37: insulating guide member

The invention claimed is:

1. An integrated electric power steering apparatus having an electric motor that generates assist torque corresponding to steering torque produced by a vehicle driver and a control unit that controls the electric motor, the electric motor and the control unit being integrally fixed to each other,
wherein the control unit is configured as a module comprising:
an inverter circuit including two or more switching devices that each supply an electric current to the electric motor;
a CPU that outputs command signals to the inverter circuit;
a wiring board on which at least the inverter circuit and the CPU are directly mounted;
a housing that contains the wiring board; and
respective connectors that are provided on the housing and connect a power source apparatus and a sensor for detecting the operation state of the vehicle, which are provided outside the control unit, with the control unit,
wherein the control unit configured as the module is integrally fixed to the electric motor in the axel direction of the electric motor,
wherein the wiring board is contained in the housing in such a way that the surface thereof is perpendicular to the axel direction,
wherein the housing has wiring members to be connected with respective winding terminals of the electric motor,
wherein each of the wiring members is disposed inside the housing in such a way as to extend in the axel direction,
wherein the wiring members penetrates the wiring board comprising respective wiring strip conductors and are welded to the respective winding terminals, and
wherein the winding terminal of the electric motor extends to the outside of the housing and is connected with the wiring member at the outside of the housing.

2. The integrated electric power steering apparatus according to claim 1, wherein all electronic components, including a rotation sensor for detecting a rotation position of a rotor of the electric motor, the switching devices, a capacitor to be connected with the inverter circuit, and a filter coil, that form the control unit are mounted and arranged on the wiring board.

3. The integrated electric power steering apparatus according to claim 1, wherein the winding terminal is connected with the wiring member through welding.

4. The integrated electric power steering apparatus according to claim 1, wherein the winding terminal is connected with the wiring member through press-fitting.

5. The integrated electric power steering apparatus according to claim 1, wherein the control unit configured as the module is fixed to the axel-direction end portion of a motor case of the electric motor, by means of an adhesive.

6. The integrated electric power steering apparatus according to claim 5,
wherein the motor case has a recess portion in the axel-direction end portion thereof,
wherein in its axel-direction end portion that faces the axel-direction end portion of the motor case, the housing has a protrusion to be inserted into the recess portion, and
wherein the recess portion of the motor case and the protrusion of the housing are bonded to each other by means of the adhesive.

7. The manufacturing method for an integrated electric power steering apparatus, according to claim 1, wherein the winding terminal of the electric motor is press-fitted with the wiring member by pressing the housing of the control unit toward the electric motor.

8. An integrated electric power steering apparatus having an electric motor that generates assist torque corresponding to steering torque produced by a vehicle driver and a control unit that controls the electric motor, the electric motor and the control unit being integrally fixed to each other,
wherein the control unit is configured as a module comprising:
an inverter circuit including two or more switching devices that each supply an electric current to the electric motor;
a CPU that outputs command signals to the inverter circuit;
a wiring board on which at least the inverter circuit and the CPU are directly mounted;
a housing that contains the wiring board; and
respective connectors that are provided on the housing and connect a power source apparatus and a sensor for detecting the operation state of the vehicle, which are provided outside the control unit, with the control unit,
wherein the control unit configured as the module is integrally fixed to the electric motor in the axel direction of the electric motor,
wherein the wiring board is contained in the housing in such a way that the surface thereof is perpendicular to the axel direction,
wherein there is provided a conductive spring member disposed between the winding terminal of the electric motor and the wiring board, and
wherein one end of the conductive spring member abuts against the winding terminal so as to be electrically connected with the winding terminal and the other terminal thereof abuts against the wiring board so as to be electrically connected with the wiring board.

9. The integrated electric power steering apparatus according to claim 8,
wherein the winding terminal has a flat portion extending in a direction perpendicular to the axel direction, wherein the wiring board has a recess portion in the surface at the electric motor side, wherein one end of the conductive spring member abuts against the flat portion of the winding terminal, and wherein the other end of the conductive spring member is inserted into the recess portion of the wiring board so as to abut against the wiring board.

10. A manufacturing method for an integrated electric power steering apparatus having an electric motor that generates assist torque corresponding to steering torque produced by a vehicle driver and a control unit that controls the electric motor and being formed in such a way that the control unit is configured as a module comprising:
an inverter circuit including two or more switching devices that each supply an electric current to the electric motor;
a CPU that outputs command signals to the inverter circuit;
a wiring board on which at least the inverter circuit and the CPU are directly mounted;
a housing that contains the wiring board; and
respective connectors that are provided on the housing and connect a power source apparatus and a sensor for detecting the operation state of the vehicle, which are provided outside the control unit, with the control unit,
in such a way that the wiring board is contained in the housing in such a way that the surface thereof is perpendicular to the axel direction of the electric motor,
in such a way that the housing has wiring members to be connected with respective winding terminals of the electric motor,
in such a way that each of the wiring members is disposed inside the housing in such a way as to extend in the axel direction, and
in such a way that the control unit configured as the module is integrally fixed to the electric motor in the axel direction of the electric motor, wherein the control unit and the electric motor are assembled separately from each other, wherein the control unit and the electric motor that are assembled separately from each other are integrally fixed to each other in the axel direction, wherein the wiring board is mounted in the housing in which the wiring member extends in the axel direction, from the electric motor side, and wherein after the electric motor and the control unit are integrated with each other, the winding terminals of the electric motor and the respective wiring members are connected with each other through welding at the outside of the housing.

* * * * *